US012242529B2

(12) United States Patent
Vasudevan et al.

(10) Patent No.: US 12,242,529 B2
(45) Date of Patent: Mar. 4, 2025

(54) HISTORICAL IMAGE SEARCH

(71) Applicant: INTERNATIONAL BUSINESS MACHINES CORPORATION, Armonk, NY (US)

(72) Inventors: Cheranellore Vasudevan, Bastrop, TX (US); Swaminathan Balasubramanian, Troy, MI (US); Sibasis Das, Kolkata (IN); Radha Mohan De, Howrah (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 411 days.

(21) Appl. No.: 17/481,534

(22) Filed: Sep. 22, 2021

(65) Prior Publication Data

US 2023/0090269 A1 Mar. 23, 2023

(51) Int. Cl.
| | |
|---|---|
| *G06K 9/00* | (2022.01) |
| *G06F 16/532* | (2019.01) |
| *G06F 16/538* | (2019.01) |
| *G06F 16/55* | (2019.01) |
| *G06F 16/583* | (2019.01) |
| *G06V 10/40* | (2022.01) |

(52) U.S. Cl.
CPC .......... *G06F 16/532* (2019.01); *G06F 16/538* (2019.01); *G06F 16/55* (2019.01); *G06F 16/583* (2019.01); *G06V 10/40* (2022.01)

(58) Field of Classification Search
CPC .................................................... G06F 16/532
See application file for complete search history.

(56) References Cited

U.S. PATENT DOCUMENTS

| | | | |
|---|---|---|---|
| 6,725,427 B2 | 4/2004 | Freeman | |
| 10,650,188 B2* | 5/2020 | Kasina | G06N 3/045 |
| 11,809,822 B2* | 11/2023 | Lin | G06N 3/044 |
| 2009/0100046 A1 | 4/2009 | Huck | |
| 2011/0235908 A1* | 9/2011 | Ke | G06V 10/751 382/218 |
| 2014/0012857 A1* | 1/2014 | Moraleda | G06V 30/418 707/741 |
| 2014/0355835 A1* | 12/2014 | Rodriguez-Serrano | G06V 20/63 382/105 |

(Continued)

FOREIGN PATENT DOCUMENTS

CN 107423442 A 9/2020

OTHER PUBLICATIONS

Ancestry, "Finding and Saving Photos", Retrieved from Internet on Sep. 10, 2021, 4 Pages. https://support.ancestry.com/s/article/Searching-for-Photos.

(Continued)

*Primary Examiner* — Hadi Akhavannik
(74) *Attorney, Agent, or Firm* — Rakesh Roy

(57) ABSTRACT

A method, computer system, and a computer program product for historical image search is provided. The present invention may include receiving an image search criteria. The present invention may also include generating a composite image search query based on the received image search criteria. The present invention may further include searching for a matching historical image based on the generated composite image search query. The present invention may also include returning a historical image search result.

14 Claims, 7 Drawing Sheets

(56) References Cited

U.S. PATENT DOCUMENTS

2018/0373955 A1* 12/2018 Soldevila .............. G06F 18/214
2021/0004716 A1    1/2021 Song

OTHER PUBLICATIONS

Bongen, "Metaphotographs: On Representing Digital Photo Collections.", University of Illinois at Urbana-Champaign, 2010, 88 pages.

Echihabi et al., "New Trends in High-D Vector Similarity Search: AI driven, Progressive, and Distributed", Proceedings of the VLDB Endowment, vol. No. ISSN 21508097, 4 Pages.

Monaghan et al., "Generating useful photo context metadata for the semantic web." 7th International Conference on Mobile Data Management (MDM'06). IEEE, 2006, 9 Pages.

Nguyen et al. "NowAndThen: a social network-based photo recommendation tool supporting reminiscence." Proceedings of the 15th International Conference on Mobile and Ubiquitous Multimedia. Dec. 12-15, 2016, 10 Pages.

Zhao, "Compositing-aware Image Search", The Chinese University of Hong Kong, ByteDance AI Lab, Adobe Research, Tencent Youtu Lab, Last Update: Aug. 18, 2018, 4 Pages. https://hszhao.github.io/projects/cais/.

Mell et al., "The NIST Definition of Cloud Computing", Recommendations of the National Institute of Standards and Technology, NIST Special Publication 800-145, Sep. 2011, 7 pages.

\* cited by examiner

HISTORICAL IMAGE SEARCH

BACKGROUND

The present invention relates generally to the field of computing, and more particularly to image retrieval technology.

Image retrieval technology is a specialized data search technique used to find images. Using existing image search techniques, a user may provide query terms based on keywords and/or reference images to find images that are similar to the query. It may be beneficial to enable a user to search for historical images that match the user's search criteria.

SUMMARY

Embodiments of the present invention disclose a method, computer system, and a computer program product for historical image search. The present invention may include receiving an image search criteria. The present invention may also include generating a composite image search query based on the received image search criteria. The present invention may further include searching for a matching historical image based on the generated composite image search query. The present invention may also include returning a historical image search result.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
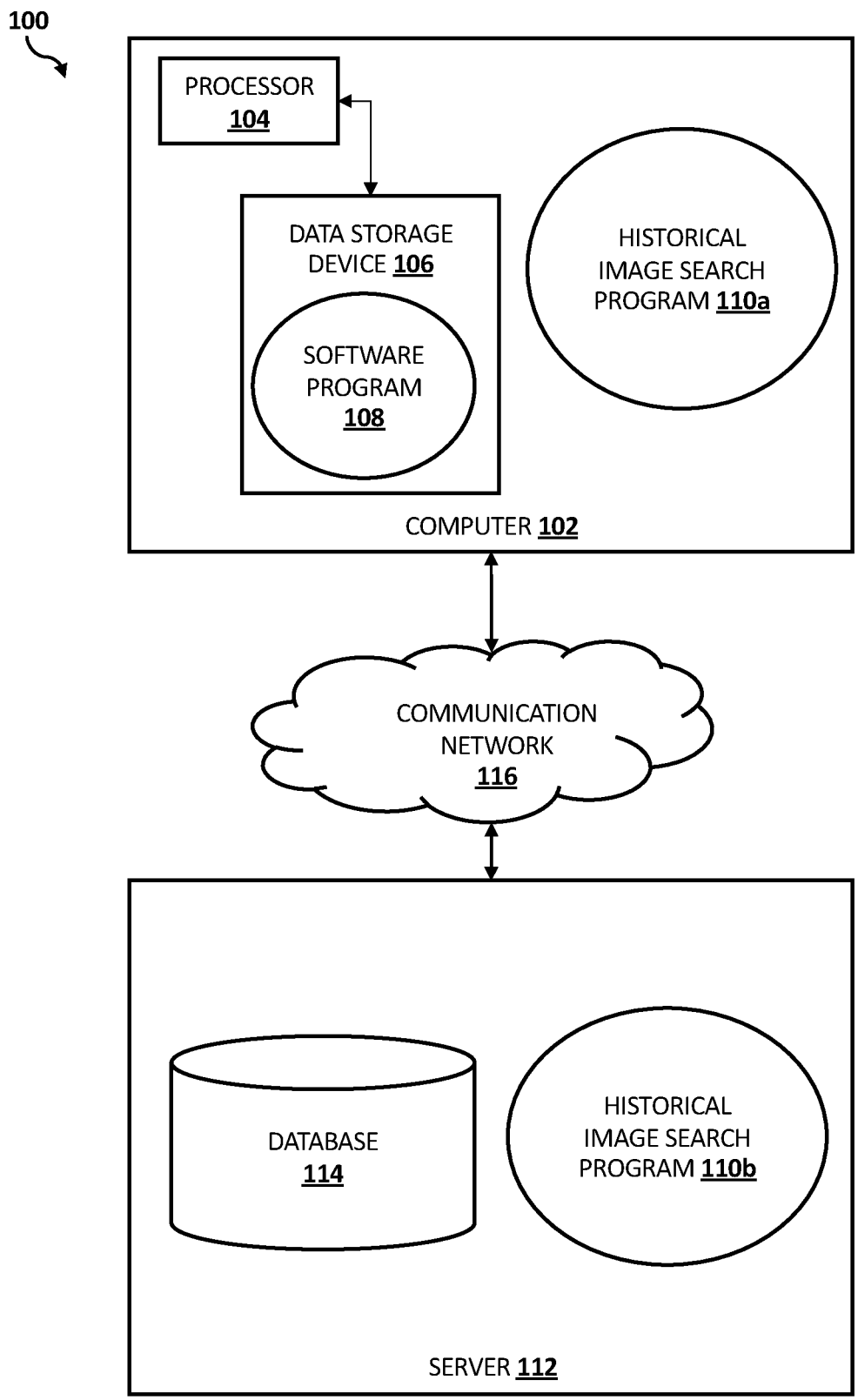
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for historical image search. As such, the present embodiment has the capacity to improve the technical field of image retrieval by generating a composite image search query for a historical image search, where the composite image search query includes a synthetic image sketch based on a reference image and contextual data. More specifically, a historical image search program receives an image search criteria from a user. Then, the historical search program generates a composite image search query based on the received image search criteria. In one embodiment, the composite image search query may include a date back synthetic image created from user provided reference image(s) (current or recent) and contextual data, such as, for example, ambient information, event details, and image search time period. Next, the historical search program may search for matching historical images based on the generated composite image search query. Thereafter, the historical search program may return one or more historical image search results.

As described previously, image retrieval technology is a specialized data search technique used to find images. Using existing image search techniques, a user may provide query terms based on keywords and/or reference images to find images that are similar to the query. It may be beneficial to enable a user to search for historical images that match the user's search criteria.

Therefore, it may be advantageous to, among other things, provide a way to search for historical images from public and private archives with search criteria that comprises a reference to a time period, event information, ambience information, and sample object images. It may also be advantageous to use artificial intelligence (AI) based image processing to create synthetic variations of reference images provided as part of the search criteria and combine other contextual information from the search criteria to generate a composite search query to find matching images.

According to at least one embodiment, the historical image search program may generate a unique image search query by referencing user provided reference images (stand alone or composite form), time period, context, and event details, to fetch an array of matching images from public and private image repositories through an online network.

According to at least one embodiment, the historical image search program may analyze the user provided information, in the form of text description, image reference, event, time period, and other contextual data, to extract the contemporary information to form an image search query. The historical image search program may implement the image search query to crawl through the online image archives (public and private with permission) to retrieve the set of matching images.

According to at least one embodiment, the historical image search program may modify the user provided reference images (e.g., generate a synthetic variation) by aging the original images back to a time period, which is manifested by other search information, like date, event, and other contextual description. This modified image may then be combined with other search information to create a composite search query to search public and private image repositories to find closest images.

According to at least one embodiment, AI techniques may be applied to understand the period of context from the user's query information and generate a synthetic image sketch by aging back the supplied image (or composite image) based on the context from the user's query information to find the closest image that matches the synthetic image.

According to at least one embodiment, a user may provide the following inputs for an image search criteria: one or more digital images (e.g., photographs; drawings; paintings); image period (e.g., current or predated); ambient information (e.g., furniture, room color, presence of famous personalities); clothing details of the human objects in the images; event details (e.g., specific holidays, celebrations); other information (e.g., presence of pets); and period of image to search (e.g., photograph from five years ago).

According to at least one embodiment, the historical image search program may generate the image search query in the following manner. The historical image search program may classify the objects in the user provided images (e.g., human, animal, furniture, landscape). Then, the historical image search program may analyze the ambient information, clothing details, events and other information, as provided by user, to add as metadata for each classified image. Then, the historical image search program may generate a date back version of the classified images (e.g., synthetic image sketch) by AI method to the age or period of the images to search, as indicated by the user, by deducting the image's date (calculated by the AI method or as indicated by the user).

According to at least one embodiment, the historical image search program may then initiate a search to find images that match the date back version of the classified images (e.g., synthetic image sketch generated by AI method). In one embodiment, the historical image search program may search for matching images in publicly available image repositories. In one embodiment, the historical image search program may also send permission seeking links to private image repository owners to allow the historical image search program to search the private image repository. In one embodiment, the historical image search program may present images from online public repositories as search results to the user. In one embodiment, once the private image repository owners provide the requisite permissions, the historical image search program may search the private image repository. In one embodiment, the historical image search program may then present the searched images to the private image repository owner to seek permission to share the images with the user. Once the permission is given by the private repository owner, the images from the private image repository may be shared with the user. In one embodiment, the historical image search program may display the search results in order of relevance to the user's image search criteria.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a historical image search program 110a. The networked computer environment 100 may also include a server 112 that is enabled to run a historical image search program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the historical image search program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the historical image search program 110a, 110b (respectively) to search for historical images from public and private archives with search criteria that comprises a reference to a time period, event information, ambience information, and sample object images to generate a synthetic image sketch as part of a composite image search query. The disclosed embodiments are explained in more detail below with respect to FIGS. 2 to 4.

Figure 2:
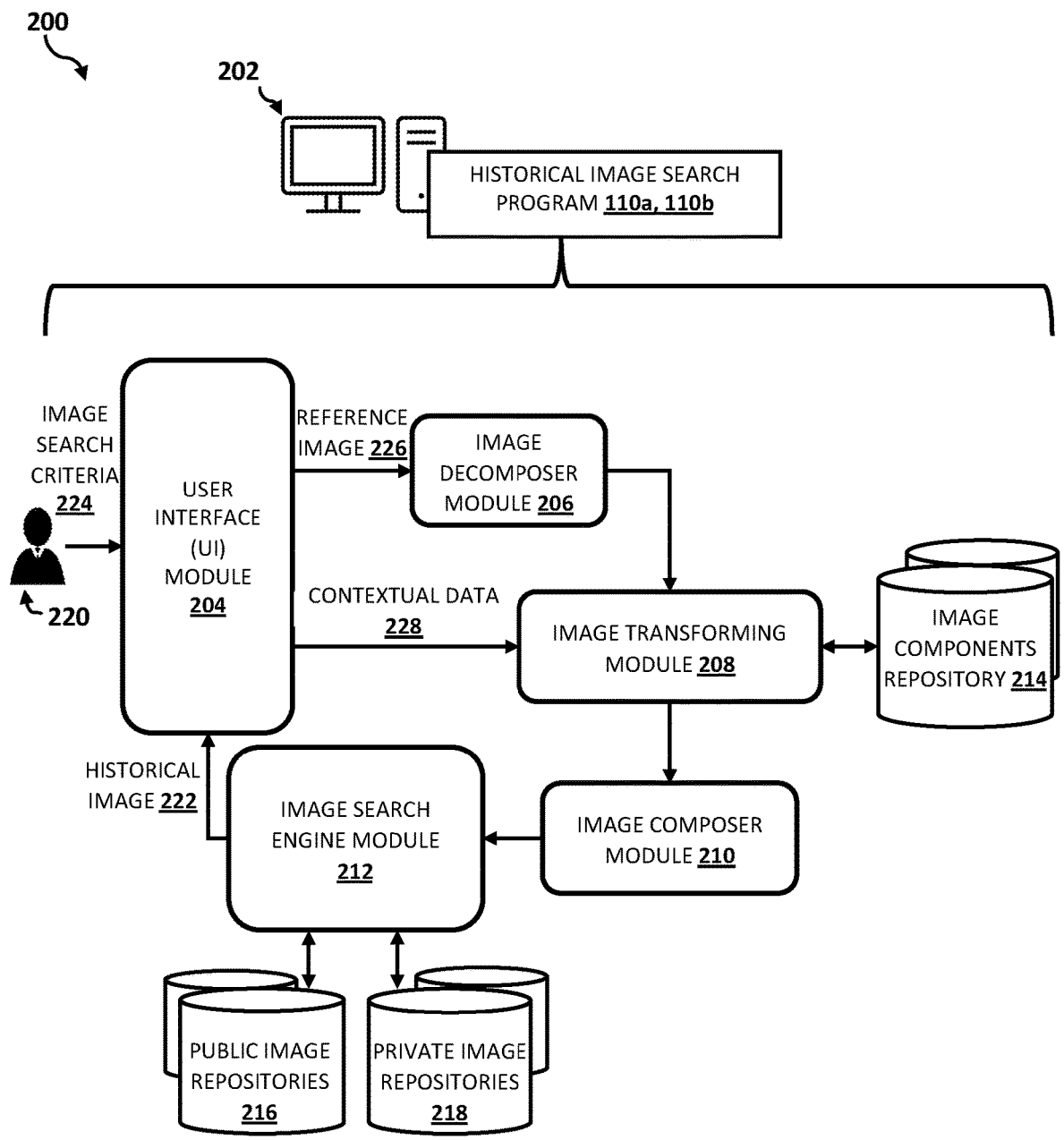
FIG. 2 is a schematic block diagram of an image retrieval environment according to at least one embodiment.

Referring now to FIG. 2, a schematic block diagram of an image retrieval environment 200 implementing the historical image search program 110a, 110b according to at least one embodiment is depicted. According to one embodiment, the image retrieval environment 200 may include one or more components (e.g., client computer 102; server computer 112; communication network 116) of the computer environment 100 discussed above with reference to FIG. 1.

According to one embodiment, the image retrieval environment 200 may include a computer system 202 having a tangible storage device and a processor that is enabled to run the historical image search program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smartphone, a smart watch or other smart wearable device, or other electronic devices.

In one embodiment, the historical image search program 110a, 110b may include a single computer program or multiple program modules or sets of instructions being executed by the processor of the computer system 202. The historical image search program 110a, 110b may include routines, objects, components, units, logic, data structures, and actions that may perform particular tasks or implement particular abstract data types. The historical image search program 110a, 110b may be practiced in distributed cloud computing environments where tasks may be performed by remote processing devices which may be linked through the communication network 116. In one embodiment, the historical image search program 110a, 110b may include program instructions that may be collectively stored on one or more computer-readable storage media.

According to one embodiment, the historical image search program 110a, 110b may include a user interface (UI) module 204, an image decomposer module 206, an image transformation module 208, an image composer module 210, and an image search engine module 212. In various embodiments, the historical image search program 110a, 110b may have access to (e.g., via communication network 116) one or more image components repositories 214, one or more public image repositories 216, and one or more private image repositories 218.

According to one embodiment, a user 220 may interact with the historical image search program 110a, 110b to retrieve one or more historical images 222 from one or more public image repositories 216 and/or one or more private image repositories 218 based on an image search criteria 224. In one embodiment, the historical image 222 may include an image that is from a time period prior to a given time period (e.g., indicated in the image search criteria 224). In some embodiments, the historical image may include a context as described by the user 220 (e.g., in the image search criteria 224).

According to one embodiment, the historical image search program 110a, 110b may implement the UI module 204 to collect the image search criteria 224 from user 220. In one embodiment, the image search criteria 224 may include one or more reference images 226 and one or more contextual data 228. In one embodiment, the reference image 226 may include digital images of any suitable digital image format (e.g., .jpg; .png; .gif). In various embodiments, the reference image 226 may include a photograph, a painting, a drawing, or any other graphical image. In one embodiment, the contextual data 228 may information associated with the reference image 226 and the historical image 222 to be searched for. In various embodiments, the contextual data 228 include a reference image period (e.g., time period of selected reference image 226); ambient information associated with the historical image 222 (e.g., furniture, room color, presence of famous personalities); clothing details associated with any human objects in the historical image 222; events or occasions captured in the historical image 222 (e.g., birthday party, national holiday, religious occasions); time period to search in for the historical image 222; and any other relevant information to provide context to the historical image 222 to search (e.g., presence of animals or pets in the image).

According to one embodiment, after collecting the image search criteria 224 (e.g., reference image 226 and contextual data 228) from the user 220, the UI module 204 may transmit the reference image 226 to the image decomposer module 206 and may transmit the contextual data 228 to the image transformation module 208. In one embodiment, the historical image search program 110a, 110b may implement the image decomposer module 206 to segment the reference image 226 into component images as necessary so that the contextual data 228 may be applied selectively by the image transformation module 208.

According to one embodiment, the image decomposer module 206 may implement AI object detection techniques to detect/identify and segment one or more distinct objects in the reference image 226. In various embodiments, the AI object detection techniques may include the Scale-Invariant Feature Transformation (SIFT) algorithm, the Histogram of Oriented Gradients (HOG) algorithm, or any suitable Convolutional Neural Network (CNN) techniques. According to one embodiment, the image decomposer module 206 may assign object classifiers/classifications (e.g., man/woman, dog/cat, tree, car) to each of the objects identified in the reference image 226.

According to one embodiment, the image decomposer module 206 may transmit the image segments (e.g., segmented based on objects detected) and the corresponding object classifications to the image transformation module 208. In one embodiment, the image transformation module 208 may apply the contextual inputs (e.g., aging back reference image, occasion, event) from the contextual data 228 to the corresponding segments of the reference image 226. In one embodiment, the image transformation module 208 may modify or transform the segments (e.g., objects detected) of the reference image 226 based on the contextual data 228. In one embodiment, the image transformation module 208 may add objects (e.g., different types of furniture, different image location) based on the contextual data 228. In one embodiment, these contextual transformations (e.g., modifying segments of the reference image 226; adding additional objects) implemented by the image transformation module 208 may be referred to as transformed segments.

According to one embodiment, the contextual data 228 may indicate that the user's image search criteria 224 is to find an aged back or historical version of the reference image 226. In one embodiment, for each identified object in the reference image 226, the image transformation module 208 may implement AI techniques to determine the type of "aging" that should be applied. In one embodiment, the aging may be determined by a family associated with the object classification determined by the image decomposer module 206. In one embodiment, the image transformation module 208 may select the associated family corresponding to the object classification. For example, a "man," "woman," "boy," or "girl" classifier may be considered under the family of "human"; a "dog" or "cat" classifier may be considered under the family of "animal"; a "car" or "furniture" may be considered under the family of "things"; and "tree" or "flower" may be considered under the family of "plants."

According to one embodiment, the image transformation module 208 may select an aging algorithm associated with each family. In one embodiment, if the family of the object is "human," the image transformation module 208 may apply AI-based facial age progression and regression techniques to adjust the object to time period in the query. For example, if the reference image 226 includes the photo of a man and the contextual data 228 indicates that the user 220 is interested in searching for a photo of that man from five years prior, the image transformation module 208 may select to apply the aging algorithm associated with the "human" family. As such, the image transformation module 208 may implement facial age regression techniques to adjust the face of the man to look five years younger. In one embodiment, the modified image of the man may be referred to as a transformed segment of the reference image 226. In one embodiment, the transformed segments of the reference image 226 may be synthetic images generated using AI techniques. As will be discussed further below, the transformed segments may be combined to generate a synthetic composite image sketch which may be used to search for a matching image.

In another embodiment, if the family associated with the image object is an "animal" (e.g., pet dog or cat), the image transformation module 208 may implement AI-based age approximation techniques to determine the animal's age from the contextual data 228. In one embodiment, the image transformation module 208 may have access to a knowledge based stored in the image components repository 214. In this embodiment, the image transformation module 208 may search the knowledge base in the image components repository 214 to identify an image of a similar animal (e.g., dog of same species) representing the approximated age. In one embodiment, the image transformation module 208 may modify the image of the animal from the reference image 226 to match the image of the animal representing the approximated age, identified in the image components repository 214. In this embodiment, the modified image of the animal may be referred to as a transformed segment of the reference image 226. In another embodiment, the image transformation module 208 may replace the image of the animal from the reference image 226 with the image of the animal representing the approximated age, identified in the image components repository 214, as the transformed segment of the reference image 226.

In another embodiment, if the family associated with the image object is a "plant" (e.g., coconut tree), the image transformation module 208 may use the knowledge base and AI-based age approximation techniques to modify the image of the plant to represent the plant at the age indicated by the contextual data 228. In this embodiment, the modified image of the plant may be referred to as a transformed segment of the reference image 226.

In another embodiment, if the family associated with the image object is a "thing" (e.g., a car), the image transformation module 208 may perform a mapping (e.g., using the knowledge base) to approximate the image object to models (e.g., in the example of the car) poplar to the time period indicated in the contextual data 228. For example, the image object may include an image of car and the contextual data 228 may indicate the time period for search as the year 1990. In this example, the image transformation module 208 may modify the image of the car using CNN to match the same with the car model from 1990. In this example, the image transformation module 208 may also replace the image of the car with an image of the car from 1990 identified in the knowledge base (e.g., in image components repository 214). In this embodiment, the modified image of the car may be referred to as a transformed segment of the reference image 226.

According to one embodiment, the contextual data 228 may include additional information regarding objects (e.g., different types of furniture, image location, room color in the image, or other ambient information) to be included in the historical image search that is beyond the objects in the reference image 226. For example, the reference image 226 may include an image of a woman that is standing and the contextual data 228 may indicate an image search criteria where the woman is sitting on a green sofa. In this example, the image transformation module 208 may identify an image of a green sofa in the image components repository 214 to be included as a transformed segment in the synthetic composite image sketch which may be used to search for the matching image.

According to one embodiment, the image transformation module 208 may transmit the transformed segments (e.g., transformed based on the context provided in the contextual data 228) to the image composer module 210. In one embodiment, the image composer module 210 may then combine the transformed segments of images to build a new composite image (e.g., synthetic image sketch) for searching in one or more repositories (e.g., public image repository 216 and/or private image repository 218). In at least one embodiment, the image composer module 210 may add one or more of the contextual data 228 as metadata (e.g., ambient information such as clothing details, events and other information as provided by the user) to the synthetic image sketch for searching the repositories. In one embodiment, the image composer module 210 may generate a composite image search query including the synthetic image sketch and the metadata for searching the repositories.

According to one embodiment, the image search engine module 212 may receive the composite image search query from the image composer module 210 and initiate a search to find matching historical images 222 in one or more public image repositories 216 and/or private image repositories 218. In one embodiment, the image search engine module 212 may identify potentially matching images based on the metadata in the composite image search query. In one embodiment, the image search engine module 212 may implement object detection to identify the objects in the potentially matching images. For each identified object, the image search engine module 212 may correlate the identified objects in the potentially matching images to the objects in the synthetic image sketch. Then, the image search engine module 212 may score each potentially matching image against the composite image search query based on the correlation between the objects in the potentially matching images to the objects in the synthetic image sketch. In one embodiment, more matching objects may result in a higher correlation, and therefore a higher score. In one embodiment, the scoring method may include a normalized matching count (e.g., [number of matching objects] divided by [total number of objects in the synthetic image sketch]). In another embodiment, the scoring method may include a weighted matching where different weights may be applied to different families (e.g., "human" matching may receive higher weight over "thing" matching). After scoring the potentially matching images, the image search engine module 212 may output the ranked historical images 222 (e.g., historical image search results) via the UI module 204.

In one embodiment, the image search engine module 212 may search for matching images in public image repositories 216 (e.g., may be searched directly) and/or private image repositories 218 (e.g., may be searched with permission). When searing in the private image repositories 218, the image search engine module 212 may send permission seeking links to private image repository owners to allow the image search engine module 212 to search the private image repository 218. In one embodiment, once the private image repository owners provide the requisite permissions, the image search engine module 212 may search the private image repository 218 and present the searched images to the private image repository owner to seek permission to share the images from the private image repository 218 with the user 220. Once the permission is given by the private repository owner, the images from the private image repository 218 may be shared with the user. In one embodiment, the image search engine module 212 may display the historical image 222 search results in order of relevance to the user's image search criteria 224.

Figure 3:
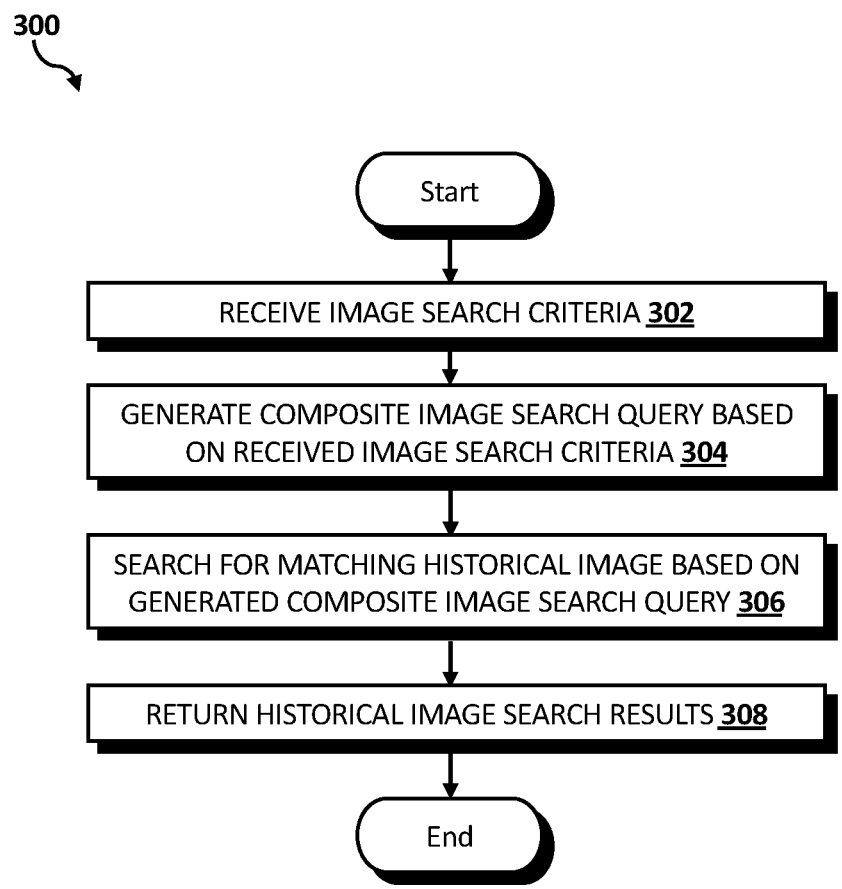
FIG. 3 is an operational flowchart illustrating a process for historical image search according to at least one embodiment.

Referring now to FIG. 3, an operational flowchart illustrating the exemplary historical image search process 300 used by the historical image search program 110*a*, 110*b* according to at least one embodiment is depicted.

At 302, an image search criteria is received. According to one embodiment, the historical image search program 110*a*, 110*b* may receive a user's image search criteria via a UI interface of the historical image search program 110*a*, 110*b*, as described previously with reference to FIG. 2. In one embodiment, the historical image search program 110*a*, 110*b* may collect one or more reference images to search along with one or more contextual data, as described previously with reference to FIG. 2.

Then at 304, a composite image search query is generated based on the received image search criteria. According to one embodiment, the composite image search query may include a synthetic image sketch comprising contextual transformations applied selectively to objects detected in the reference image, as described previously with reference to FIG. 2. In one embodiment, the contextual transformations may include transformations to the objects detected in the reference image based on age. In one embodiment, the contextual transformations may include transformations based on ambient information provided by the user, such as, for example, clothing details and events depicted in the image. In one embodiment, the historical image search program 110*a*, 110*b* may combine transformed segments of images to generate the synthetic image sketch, as described previously with reference to FIG. 2. In one embodiment, the composite image search query may also include metadata added to the synthetic image sketch describing the contextual data provided by the user.

Then at 306, one or more matching historical images are searched for based on the generated composite image search query. According to one embodiment, the historical image search program 110*a*, 110*b* may search for matching images in public image repositories (e.g., may be searched directly) and/or private image repositories (e.g., may be searched with permission), as described previously with reference to FIG. 2.

Thereafter at 308, historical image search results are returned. According to one embodiment, the historical image search program 110*a*, 110*b* may score each potentially matching image (e.g., found in public image repositories and/or private image repositories) against the composite image search query based on the correlation between the objects in the potentially matching images to the objects in the synthetic image sketch. In one embodiment, more matching objects may result in a higher correlation, and therefore a higher score. In another embodiment, the scoring method may include a weighted matching where different weights may be applied to different families (e.g., "human" matching may receive higher weight over "thing" matching), as described previously with reference to FIG. 2. After scoring the potentially matching images, the historical image search program 110*a*, 110*b* may output the ranked historical images via the UI of the historical image search program 110*a*, 110*b*.

Figure 4:
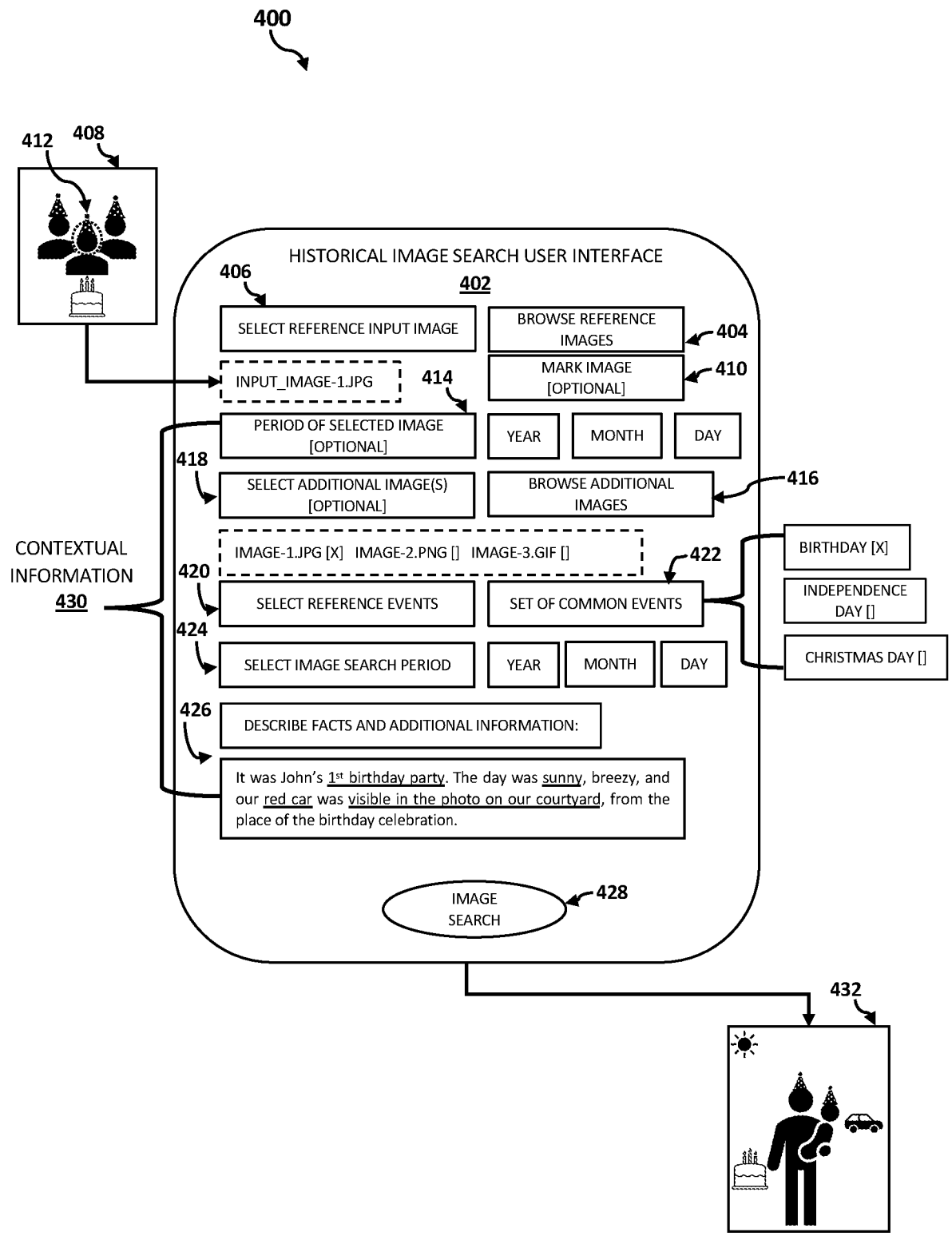
FIG. 4 is a block diagram of a user interface according to at least one embodiment.

Referring now to FIG. 4, a block diagram 400 illustrating a UI of the historical image search program 110*a*, 110*b* according to at least one embodiment is depicted.

According to one embodiment, a historical image search UI 402 may be implemented by the UI module 204, as described previously with reference to FIG. 2. In one embodiment, the historical image search UI 402 may include a first UI component 404 to enable a user to browse for reference images on a user device. In one embodiment, the historical image search UI 402 may include a second UI component 406 to enable a user to select one or more reference input images. For example, the user may select the reference input image 408 including a jpg format ("input_image-1.jpg"). In one embodiment, the historical image search UI 402 may include a third UI component 410 to enable a user to mark the selected image to indicate the image object of interest for the historical image search. For example, the third UI component 410 may enable the user to apply a digital mark 412 (e.g., may aid in object detection) to the reference input image 408 to indicate the object of interest in the reference input image 408. In one embodiment, the third UI component 410 may be optional.

According to one embodiment, the historical image search UI 402 may include a fourth UI component 414 to indicate a period of the selected reference input image. In one embodiment, the historical image search UI 402 may include a fifth UI component 416 to browse for additional images that are similar to the reference input image 408 to strengthen the reference for the search. In one embodiment, the historical image search UI 402 may include a sixth UI component 418 to select the additional images to strengthen the reference for the search. In one embodiment, the historical image search UI 402 may include a seventh UI component 420 to select the reference events to be searched for as being depicted in the historical image. In one embodiment, the historical image search UI 402 may include an eighth UI component 422 to select a set of common events depicted in the reference input image 408 and the historical image. In this example, a birthday party as the common event depicted in the reference input image 408 and the historical image. In one embodiment, the historical image search UI 402 may include a ninth UI component 424 to select an image search period (e.g., year/month/day to search for the historical image). In one embodiment, the historical image search UI 402 may include a tenth UI component 426 to enable the user to textual describe facts and any other additional information regarding the historical image search. In this example, the user may use the tenth UI component 426 to input additional information, such as, for example, the fact that the historical image illustrates a "first birthday party," a "sunny day", and a "red car" that is "visible in the photo" in the background. In one embodiment, the historical image search UI 402 may include an eleventh UI component 428 to initiate the image search.

According to one embodiment, the user may interact with the fourth UI component 414 to the tenth UI component 426 to input contextual information 430, which the historical image search program 110*a*, 110*b* may apply to the reference input image 408 to generate the synthetic image sketch, as described previously with reference to FIG. 2. Based on the image search in this example, the historical image search program 110*a*, 110*b* may output a historical image 432 depicting a first birthday party on a sunny day and a red car in the background of the image.

The functionality of a computer may be improved by the historical image search program 110*a*, 110*b* because the historical image search program 110*a*, 110*b* may enable the computer to provide a way to search for historical images from public and private archives with search criteria that comprises a reference to a time period, event information, ambience information, and sample object images. The historical image search program 110*a*, 110*b* may also enable the computer to AI based image processing to create synthetic variations of reference images provided as part of the search criteria and combine other contextual information from the search criteria to generate a composite search query to find matching images.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
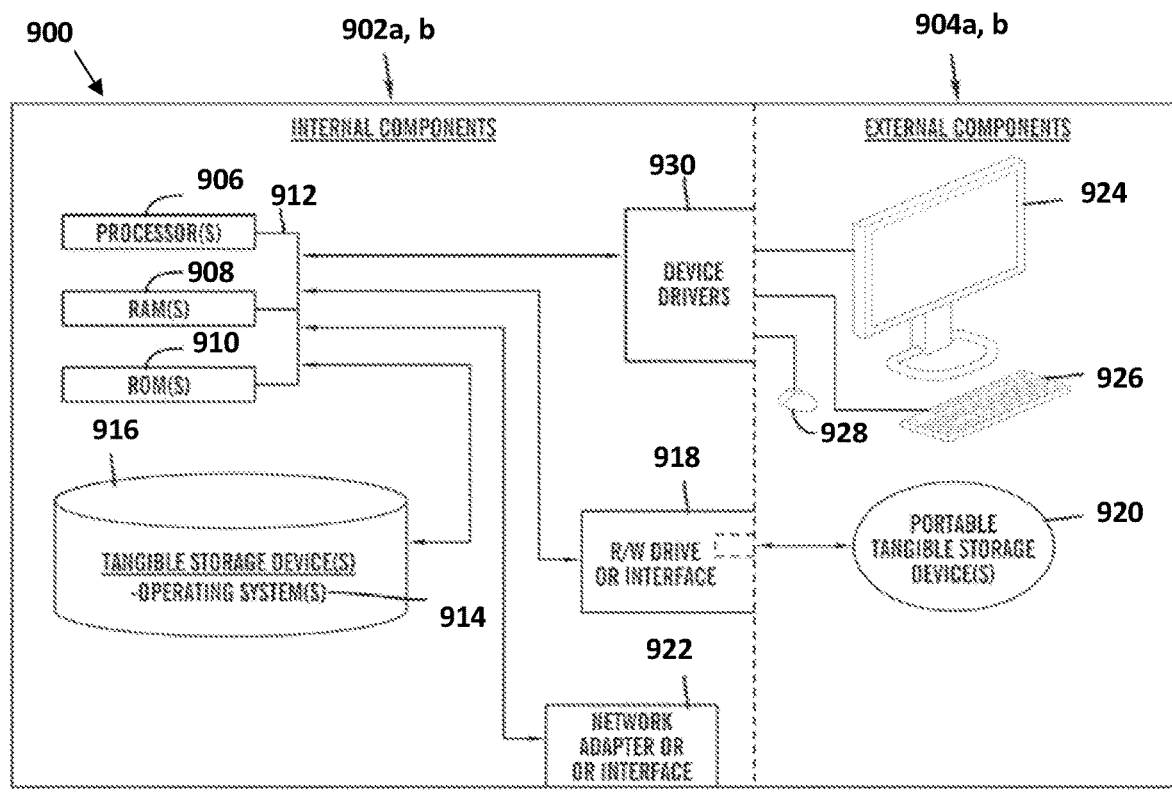
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the historical image search program 110a in client computer 102, and the historical image search program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the historical image search program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the historical image search program 110a in client computer 102 and the historical image search program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the historical image search program 110a in client computer 102 and the historical image search program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
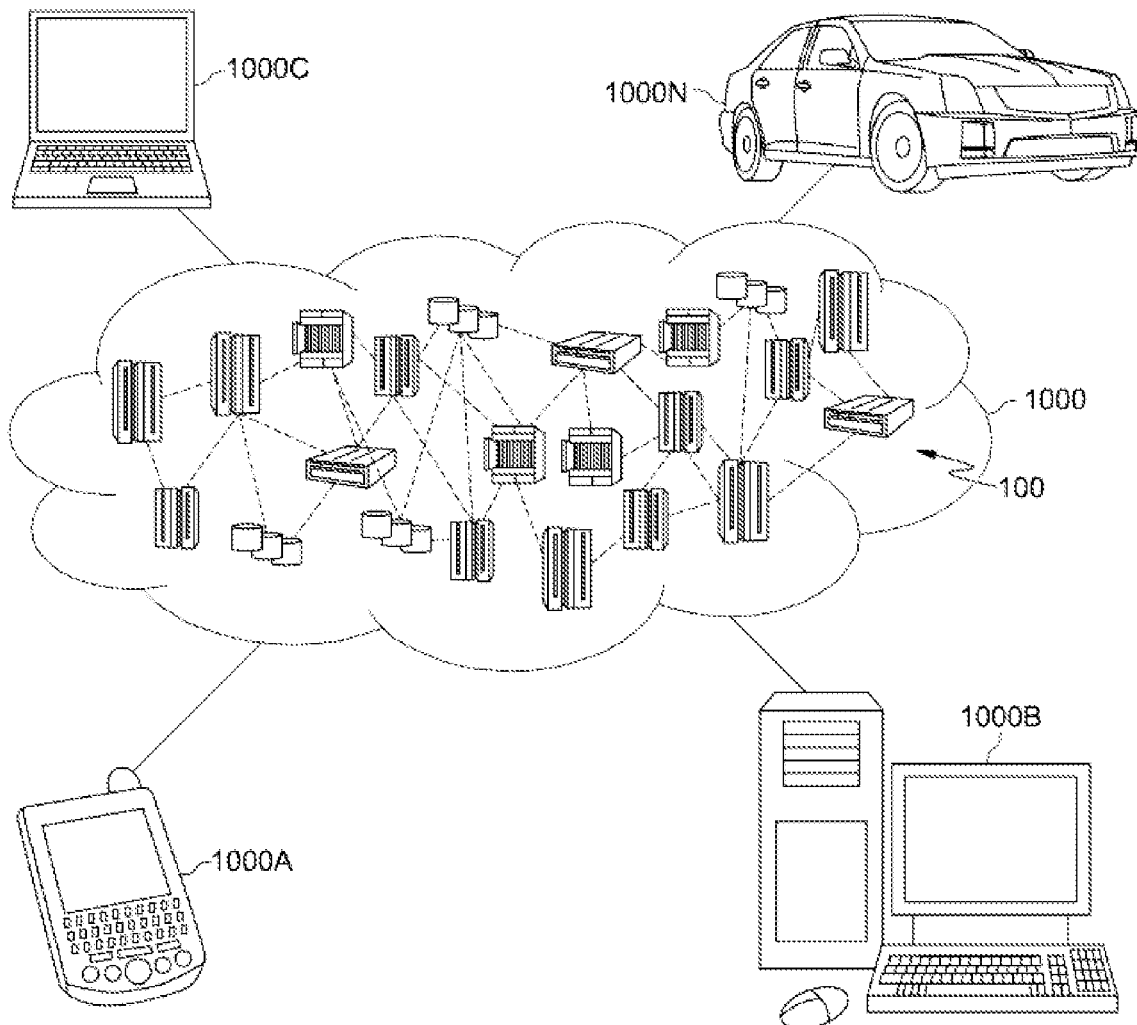
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
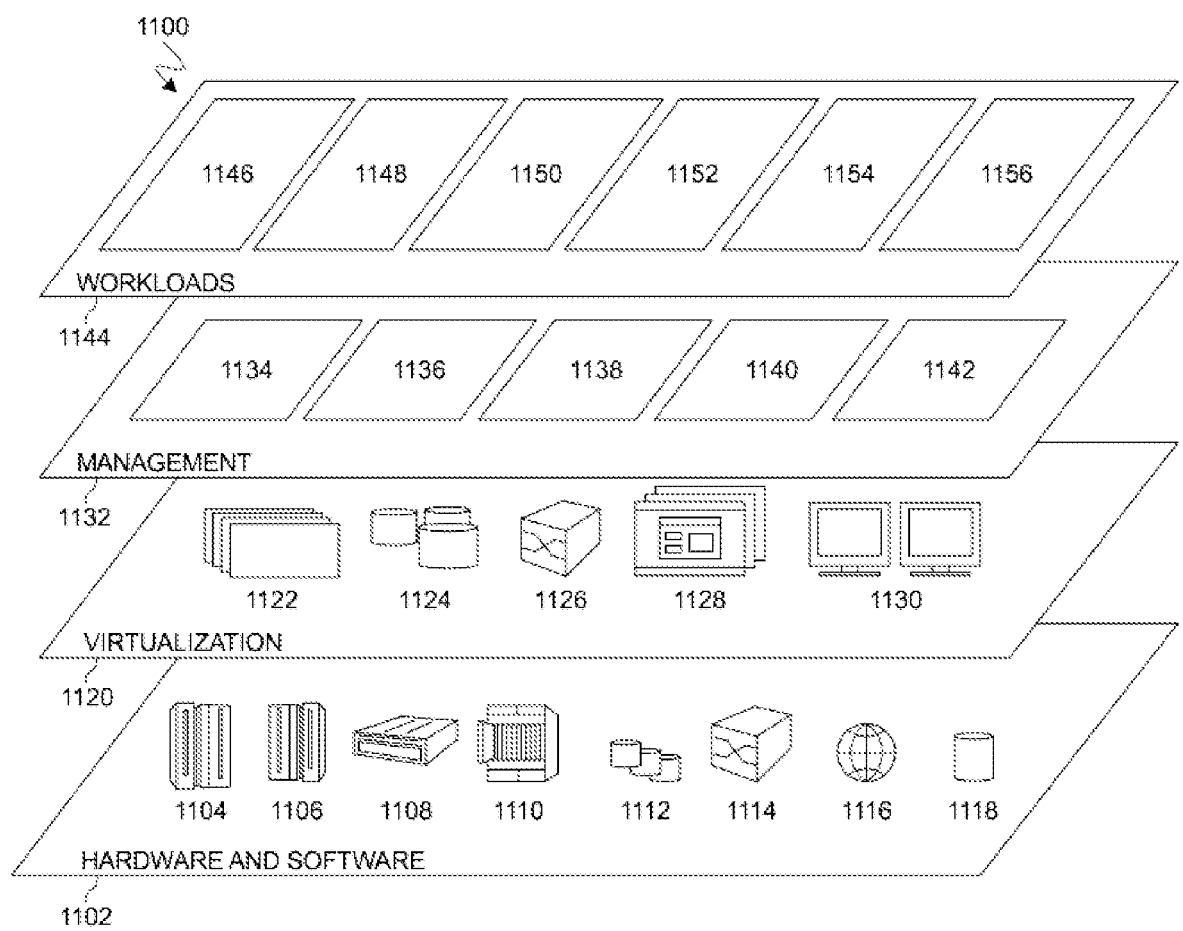
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and historical image search 1156. A historical image search program 110a, 110b provides a way to search for historical images from public and private archives with search criteria that comprises a reference to a time period, event information, ambience information, and sample object images to generate a synthetic image sketch as part of a composite image search query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving an image search criteria including at least one reference image and at least one contextual data;
    generating a composite image search query including a synthetic image sketch based on a plurality of transformed segments from the at least one reference image, wherein the plurality of transformed segments include modifications based on the at least one contextual data;
    searching for a matching historical image based on the generated composite image search query; and
    returning a historical image search result.

2. The method of claim 1, further comprising:
    classifying at least one object detected in the at least one reference image;
    modifying the classified at least one object detected in the at least one reference image based on the at least one contextual data; and
    generating the synthetic image sketch including the modified at least one object detected in the at least one reference image.

3. The method of claim 1, further comprising:
    assigning an object classifier to an object detected in the at least one reference image;
    determining a family of the object associated with the assigned object classifier;
    selecting an aging algorithm based on the determined family of the object detected in the at least one reference image; and
    transforming the object based on the selected aging algorithm.

4. The method of claim 1, wherein the synthetic image sketch further comprises an aged back version of the at least one reference image, and wherein the aged back version of the at least one reference image includes modifying at least one object detected in the at least one reference image based on age.

5. The method of claim 1, wherein the generated composite image search query further comprises at least one metadata added to the synthetic image sketch to describe the at least one contextual data associated with the matching historical image.

6. A computer system for historical image search, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    receiving an image search criteria including at least one reference image and at least one contextual data;
    generating a composite image search query including a synthetic image sketch based on a plurality of transformed segments from the at least one reference image, wherein the plurality of transformed segments include modifications based on the at least one contextual data;
    searching for a matching historical image based on the generated composite image search query; and
    returning a historical image search result.

7. The computer system of claim 6, further comprising:
    classifying at least one object detected in the at least one reference image;
    modifying the classified at least one object detected in the at least one reference image based on the at least one contextual data; and
    generating the synthetic image sketch including the modified at least one object detected in the at least one reference image.

8. The computer system of claim 6, further comprising:
    assigning an object classifier to an object detected in the at least one reference image;
    determining a family of the object associated with the assigned object classifier;
    selecting an aging algorithm based on the determined family of the object detected in the at least one reference image; and
    transforming the object based on the selected aging algorithm.

9. The computer system of claim 6, wherein the synthetic image sketch further comprises an aged back version of the at least one reference image, and wherein the aged back version of the at least one reference image includes modifying at least one object detected in the at least one reference image based on age.

10. The computer system of claim 6, wherein the generated composite image search query further comprises at least one metadata added to the synthetic image sketch to describe the at least one contextual data associated with the matching historical image.

11. A computer program product for historical image search, comprising:
    one or more computer-readable storage media and program instructions collectively stored on the one or more computer-readable storage media, the program instructions executable by a processor to cause the processor to perform a method comprising:
    receiving an image search criteria including at least one reference image and at least one contextual data;
    generating a composite image search query including a synthetic image sketch based on a plurality of transformed segments from the at least one reference image, wherein the plurality of transformed segments include modifications based on the at least one contextual data;
    searching for a matching historical image based on the generated composite image search query; and
    returning a historical image search result.

12. The computer program product of claim 11, further comprising:
    classifying at least one object detected in the at least one reference image;
    modifying the classified at least one object detected in the at least one reference image based on the at least one contextual data; and generating the synthetic image sketch including the modified at least one object detected in the at least one reference image.

13. The computer program product of claim 11, further comprising:
    assigning an object classifier to an object detected in the at least one reference image;
    determining a family of the object associated with the assigned object classifier;
    selecting an aging algorithm based on the determined family of the object detected in the at least one reference image; and
    transforming the object based on the selected aging algorithm.

14. The computer program product of claim 11, wherein the synthetic image sketch further comprises an aged back version of the at least one reference image, and wherein the aged back version of the at least one reference image includes modifying at least one object detected in the at least one reference image based on age.

* * * * *